United States Patent
White

(10) Patent No.: US 9,800,829 B2
(45) Date of Patent: *Oct. 24, 2017

(54) ARCHITECTURAL SCALE COMMUNICATIONS SYSTEMS AND METHODS THEREFORE

(71) Applicant: Telepresence Technologies, LLC, Plano, TX (US)

(72) Inventor: Peter McDuffie White, McKinney, TX (US)

(73) Assignee: Telepresence Technologies, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,490

(22) Filed: Apr. 4, 2016

(65) Prior Publication Data

US 2016/0295170 A1 Oct. 6, 2016

Related U.S. Application Data

(60) Provisional application No. 62/142,249, filed on Apr. 2, 2015.

(51) Int. Cl.
*H04N 7/15* (2006.01)
*H04N 7/14* (2006.01)
(Continued)

(52) U.S. Cl.
CPC ....... *H04N 7/142* (2013.01); *G06K 19/06037* (2013.01); *G06Q 30/00* (2013.01); *H04N 7/15* (2013.01); *H04N 7/157* (2013.01); *H04N 13/0059* (2013.01); *H04N 21/2547* (2013.01); *H04N 21/44008* (2013.01); *H04N 21/812* (2013.01)

(58) Field of Classification Search
CPC ............ H04N 7/15; H04N 7/152; H04N 7/14; G06Q 10/10; H04W 4/02
USPC .......................... 348/14.01–14.16; 705/7.19
See application file for complete search history.

(56) References Cited

U.S. PATENT DOCUMENTS 2,420,198 A  5/1947  Rosenthal et al.
4,022,461 A  5/1977  Harris
(Continued)

FOREIGN PATENT DOCUMENTS

GB  2353429 A  2/2001
KR  20020074274 A  9/2002
(Continued)

OTHER PUBLICATIONS

De Silva, L.C. et al., "A Multiple Person Eye Contact (MPEC) Teleconferencing System," Proceedings of the International Conference on Image Processing (ICIP), US, Los Alamitos, IEEE Comp. Soc. Press, Oct. 23, 1995, pp. 607-610.

(Continued)

*Primary Examiner* — Melur Ramakrishnaiah
(74) *Attorney, Agent, or Firm* — Slater Matsil, LLP

(57) ABSTRACT

An architectural structure incorporates advanced video conference communications systems that embody two-way mirrors to reflect room surfaces to appear superimposed with an image display device to create a perception of depth. The processes for delivering professional services using video conference systems with two-way mirror configurations are presented herein.

23 Claims, 6 Drawing Sheets

(51) Int. Cl.

| | | |
|---|---|---|
| G06K 19/06 | (2006.01) | |
| H04N 13/00 | (2006.01) | |
| H04N 21/2547 | (2011.01) | |
| H04N 21/81 | (2011.01) | |
| G06Q 30/00 | (2012.01) | |
| H04N 21/44 | (2011.01) | |

(56) References Cited

U.S. PATENT DOCUMENTS

| | | |
|---|---|---|
| 4,232,939 A | 11/1980 | Kikuchi |
| 4,298,246 A | 11/1981 | Iwamura |
| 4,309,073 A | 1/1982 | Nishimura et al. |
| 4,558,922 A | 12/1985 | Smith |
| 4,572,632 A | 2/1986 | Bodier et al. |
| 4,580,880 A | 4/1986 | Watson |
| 4,732,441 A | 3/1988 | Cheng |
| 4,738,522 A | 4/1988 | Lunde et al. |
| 4,738,526 A | 4/1988 | Larish |
| 4,805,895 A | 2/1989 | Rogers |
| 4,821,307 A | 4/1989 | Flint, III |
| 4,965,819 A | 10/1990 | Kannes |
| 5,061,061 A | 10/1991 | Robley et al. |
| 5,117,285 A | 5/1992 | Nelson et al. |
| 5,194,955 A | 3/1993 | Yoneta et al. |
| 5,221,937 A | 6/1993 | Machtig |
| 5,255,028 A | 10/1993 | Biles |
| 5,278,596 A | 1/1994 | Machtig |
| 5,365,354 A | 11/1994 | Jannson et al. |
| 5,400,069 A | 3/1995 | Braun et al. |
| 5,438,357 A | 8/1995 | McNelley |
| 5,473,469 A | 12/1995 | Magocs et al. |
| 5,528,425 A | 6/1996 | Beaver |
| 5,532,736 A | 7/1996 | Kuriki et al. |
| 5,541,769 A | 7/1996 | Ansley et al. |
| 5,549,004 A | 8/1996 | Nugent |
| 5,550,754 A | 8/1996 | McNelley et al. |
| 5,573,325 A | 11/1996 | Lekowski |
| 5,609,939 A | 3/1997 | Petersen et al. |
| 5,619,254 A | 4/1997 | McNelley |
| 5,639,151 A | 6/1997 | McNelley et al. |
| 5,685,625 A | 11/1997 | Beaver |
| 5,689,553 A | 11/1997 | Ahuja et al. |
| 5,777,665 A | 7/1998 | McNelley et al. |
| 5,782,547 A | 7/1998 | Machtig et al. |
| 5,837,346 A | 11/1998 | Langille et al. |
| 5,865,519 A | 2/1999 | Maass |
| 5,890,787 A | 4/1999 | McNelley et al. |
| 5,892,538 A | 4/1999 | Gibas |
| 5,923,469 A | 7/1999 | Machtig et al. |
| 5,953,052 A | 9/1999 | McNelley et al. |
| 5,963,246 A | 10/1999 | Kato |
| 6,023,369 A | 2/2000 | Goto |
| 6,042,233 A | 3/2000 | Mihashi et al. |
| 6,042,235 A | 3/2000 | Machtig et al. |
| 6,044,226 A | 3/2000 | McWilliams |
| 6,086,380 A | 7/2000 | Chu et al. |
| 6,104,424 A | 8/2000 | McNelley |
| 6,243,130 B1 | 6/2001 | McNelley et al. |
| 6,290,359 B1 | 9/2001 | Shriver |
| 6,323,892 B1 | 11/2001 | Mihara |
| 6,351,762 B1 | 2/2002 | Ludwig et al. |
| 6,421,174 B1 | 7/2002 | Ooshima et al. |
| 6,600,600 B2 | 7/2003 | Chen |
| 6,704,294 B1 | 3/2004 | Cruickshank |
| 6,710,797 B1 | 3/2004 | McNelley et al. |
| 6,809,419 B2 | 10/2004 | Minami et al. |
| 7,057,637 B2 | 6/2006 | White |
| 9,160,866 B1 * | 10/2015 | Keiser ............... H04M 15/8083 |
| 2002/0191390 A1 | 12/2002 | Newhouse et al. |
| 2003/0018531 A1 * | 1/2003 | Mahaffy ................ G06Q 20/20 |
| | | 705/16 |
| 2003/0061271 A1 * | 3/2003 | Pittarelli ............... H04N 3/493 |
| | | 709/203 |
| 2003/0103075 A1 * | 6/2003 | Rosselot ................. H04L 41/22 |
| | | 715/717 |
| 2004/0181801 A1 | 9/2004 | Hagen et al. |
| 2004/0207724 A1 | 10/2004 | Crouch et al. |
| 2005/0099605 A1 | 5/2005 | Buchner |
| 2005/0237382 A1 * | 10/2005 | White .................... H04N 7/144 |
| | | 348/14.16 |
| 2006/0181607 A1 | 8/2006 | McNelley et al. |
| 2006/0245745 A1 | 11/2006 | Mazon |
| 2008/0144203 A1 | 6/2008 | Williams |
| 2009/0273724 A1 | 11/2009 | Kawahara et al. |
| 2011/0012988 A1 | 1/2011 | Gorzynski et al. |
| 2012/0316950 A1 * | 12/2012 | LaPorte ............ G06Q 20/3276 |
| | | 705/14.33 |
| 2013/0263227 A1 * | 10/2013 | Gongaware ............. H04L 63/08 |
| | | 726/4 |
| 2013/0265432 A1 * | 10/2013 | Freedman .......... G06Q 20/1085 |
| | | 348/150 |
| 2014/0032705 A1 * | 1/2014 | Williams ................ H04L 63/08 |
| | | 709/217 |
| 2014/0139615 A1 * | 5/2014 | Graham ................ H04R 3/005 |
| | | 348/14.08 |
| 2015/0089394 A1 | 3/2015 | Chen et al. |
| 2016/0104122 A1 * | 4/2016 | Mande ............... G06Q 10/1095 |
| | | 705/7.19 |

FOREIGN PATENT DOCUMENTS

| | | |
|---|---|---|
| WO | 9430016 | 12/1994 |
| WO | 9609722 | 3/1996 |
| WO | 0111880 A1 | 2/2001 |

OTHER PUBLICATIONS

"Eye-to-Eye Contact for Desk-to-Desk Video Conferencing," IBM Technical Disclosure Bulletin, vol. 35, No. 2, Jul. 1992, pp. 316-318.

Komatsu, T. et al., "41.2: Multiscreen Display Method for Expanding Stereoscopic Viewing Space," SID International Symposium—Digest of Technical Papers, US, Playa Del Rey, SID, vol. 24, May 16, 1993, pp. 905-908.

Wellens, R., "A device that provides an eye-to-eye video perspective for interactive television," Behavior Research Methods & Instruments, vol. 10 (1), 1978, pp. 25-26.

* cited by examiner

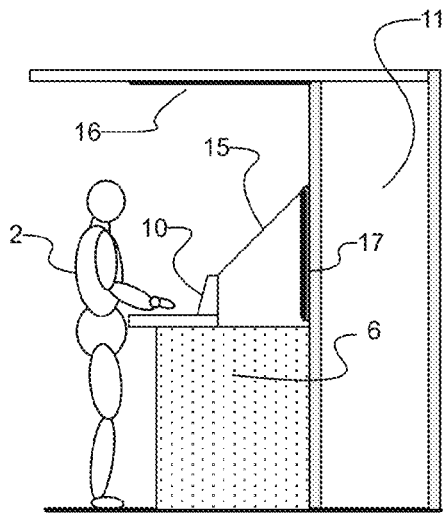
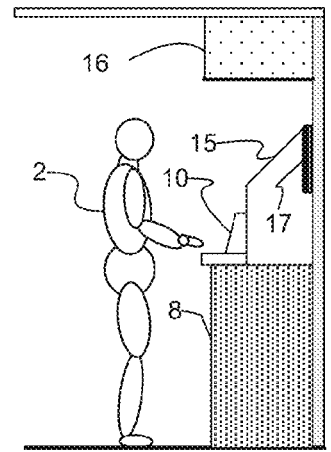
Fig. 5     Fig. 6
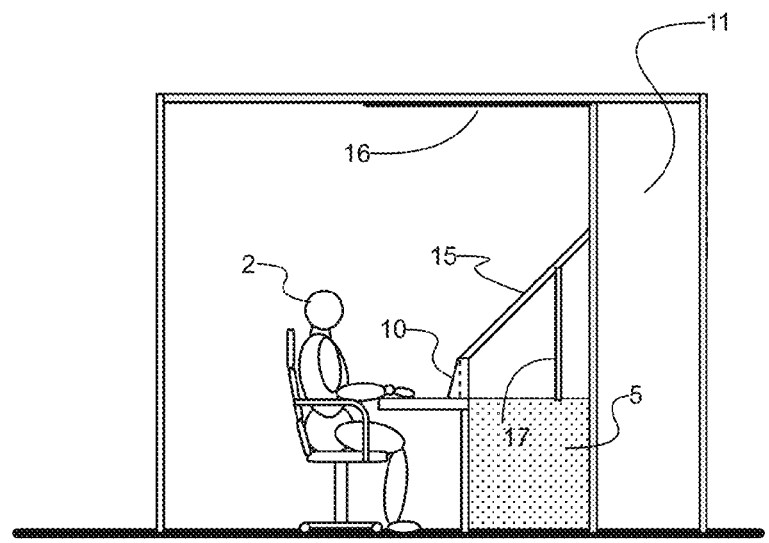
Fig. 7

ARCHITECTURAL SCALE COMMUNICATIONS SYSTEMS AND METHODS THEREFORE

CROSS-REFERENCE TO RELATED APPLICATIONS

This application claims priority to U.S. Provisional Patent Application No. 62/142,249, entitled "TelePresence Architectural Systems and Methods Therefore," filed on Apr. 2, 2015. This application is related to the following U.S. Patents and U.S. Patent Application, all of which are incorporated herein by reference: U.S. Pat. No. 7,057,637, entitled "Reflected Backdrop for Communication Systems," issued on Jun. 6, 2006; U.S. Pat. No. 8,208,007, entitled "3D Displays and Telepresence Systems and Methods Therefore," issued Jun. 26, 2012; U.S. Pat. No. 7,760,229, entitled "Reflected Backdrop for Communication Systems," issued on Jul. 20, 2010; U.S. Pat. No. 8,599,239, entitled "Telepresence System and Methods Therefore," issued on Dec. 3, 2013; U.S. Pat. No. 8,520,064, entitled "Visual Displays and TelePresence Embodiments with Perception of Depth," issued on Aug. 27, 2013; and U.S. patent application Ser. No. 15/089,142 filed on Apr. 1, 2016 and entitled "Architectural Scale Communications Systems and Methods Therefore".

TECHNICAL FIELD

This present invention relates to a video conference system within architectural spaces that embody the three-dimensional video display and communications system as an integral component of the physical structure and operational infrastructure, and methods for utilizing same.

BACKGROUND

There is a need for an improved method for people to meet at a designated location for the purposes of conducting business. Presently people go to a bank, medical center, government office or other publicly accessible building to meet with a business representative. These meetings are for a specific purpose, which are supported at the commercial enterprise within the building. However, it is not always practical and sometimes not possible for these enterprises to have the needed professionals available at that location to meet with an incoming customer.

To solve the need for putting a customer in communication with a representative at a business location, some companies have used video conferencing to conduct a meeting over a distance. Typically, these video conferences have not provided an adequate replacement for a meeting in person, since the quality of the displayed image of the remote business representative and the communications experience is inadequate. An advanced form of video conferencing, called telepresence, has emerged to improve the distance communication experience. These telepresence systems may use larger screens to display the transmitted representative at life-size and may have an improved perception of eye contact. A further advancement presented by White in (patent reference) may provide a three dimensional sense of presence.

A bank customer will typically go to a branch of a bank to sit down with a banking representative to conduct the financial transaction. Since it is not possible to have banking professionals at every branch at all hours for walk-in customers, it would be more practical to have the banking representative transmitted by an advanced video communications solution, such as telepresence, to meet with the customer.

Most prior art configurations of telepresence are self-contained products that are placed within a meeting room. These rooms may not be suited for the communications experience of the meeting. In particular, these "stand alone" systems may only provide a video communication with the distant business representative without having a tangible relationship to the building where the customer came for the business activity. While a distance communication solution may allow for a customer to have a video experience of seeing and talking to a business representative, this may not be adequate for conducting the necessary business processes. As an example, a customer going to a financial institution may need to complete a confidential transaction, such as getting a cashier's check, signing a loan document or opening a new account. The stand alone telepresence system may not provide integrated equipment to complete the financial transaction.

There is a need for an architectural solution and method of using same that integrates advanced video communications into the building to support the business processes at that location and to generate a more natural experience of people meeting in a professional services building.

Prior art configurations have achieved a telepresence configuration within, but physically independent of and functionally isolated from, an architectural setting. The prior art of FIG. 1 illustrates a side view of a room 1 with a customer 2 and a telepresence system 3. The telepresence system 3 is not physically connected to the walls or ceiling of the room 1. The prior art of FIG. 2 illustrates a plan view of the room 1 with the customer 2 seated in front of the telepresence system 3. The placement of the telepresence system 3 in the room 1 is independent of and functionally isolated from the architectural structure.

The placement of a freestanding and independent telepresence system within a room may address the issue of video communication between a customer and a representative. However, the customer experience will be limited to talking to an electronic device. This configuration is not effective at creating a natural experience of meeting with a person. Instead, the display technology is obvious as a device placed in the room and the transmitted person appears contained within the boundaries of the stand alone display device.

Hence there is a need for a more advanced configuration and business method that more seamlessly meets the needs of people within professional services buildings.

SUMMARY

The advancements beyond prior art are addressed in the preferred embodiments of the present invention. In accordance with one aspect of the present invention, there is an architectural structure that is accessible to the public, called a "Professional Services Terminal." By way of comparison, a railway terminal or an airplane terminal is an architectural structure where people go to make connections to travel to national and international locations. A Professional Services Terminal is described as an architectural structure where people go to make national and international connections through an advanced form of telepresence for customers to meet over distance video communication with customer service representatives transmitting from other locations.

Telepresence is generally considered to be an advanced form of distance communication that incorporates a live two-way video communication in real time. Telepresence may display a representative of a professional services company as a life-size or close to life-size image at the location of their customers, which may be at a Professional Services Terminal. In the embodiments of this present invention the representative may be viewed by a camera in a transmission system that may use a two-way mirror to align the camera view with the line of sight for an apparent eye contact with the customer and to achieve a three dimensional visual effect by reflecting a backdrop to appear a distance behind the displayed person. The resulting communications solution may be called 3D TelePresence.

A computer with a software codec or a hardware codec may be used to transmit the video in high definition and the image display device may display the image of the transmitted representative at the customer location in high definition. The receiving system at the customer location, called the 3D TelePresence System, may have an image display device to display the incoming image of the representative at life-size or near life-size. The 3D TelePresence System may incorporate a two-way mirror to reflect a backdrop image to appear on a plane positioned a distance behind the plane of the image display device so that the superimposed image provides a depth cue that may be perceived by the customer as causing the displayed representative to appear three dimensional within the setting of the room at a true physical depth.

An advantage of a Professional Services Terminal is that the 3D TelePresence Systems are integrated into the architectural design. Instead of placing a telepresence system in a room, the architectural spaces themselves are the embodiment of the display technology. As a result, the interior of the building creates architectural spaces that incorporate both physical human presence and human telepresence.

The location of the Professional Services Terminal may be within a catchment area with a population large enough to support a business enterprise of professional services delivered within this architectural structure. The site of the terminal may have road access and parking and/or close proximity to public transportation services. The Professional Services Terminal may be a dedicated free standing building, an architectural space within an existing building or an architectural structure within an environmentally controlled environment.

The embodiment of the present invention of a Professional Services Terminal is a different architectural space than a typical business office in that the professionals delivering the services are not physically in the building. The terminal is an architectural scale video communications system where customers actually walk into the display system. Every aspect of the architectural space may be designed to address the capturing of the image of the customers and displaying the image of the representatives of the professional services providers.

The method for the delivery of professional services using 3D TelePresence may incorporate specific technical processes, equipment specifications, systems configurations and methods of operation, all further discussed herein.

BRIEF DESCRIPTION OF THE DRAWINGS

Other advantages and features of the invention will become apparent on examining the detailed description of completely non-limiting embodiments, and the appended drawings, in which:

FIG. 5 illustrates a side view of a customer at a standing configuration of a 3D TelePresence System integrated into the architecture of a Professional Services Terminal;

FIG. 6 illustrates a side view of a customer standing at a kiosk configuration of a 3D TelePresence System that is integrated into the architecture of a Professional Services Terminal;

FIG. 7 illustrates a side view of a customer seated at a meeting table configuration of a 3D TelePresence System integrated into a Professional Services Terminal;

DETAILED DESCRIPTION OF ILLUSTRATIVE EMBODIMENTS

Figure 1:
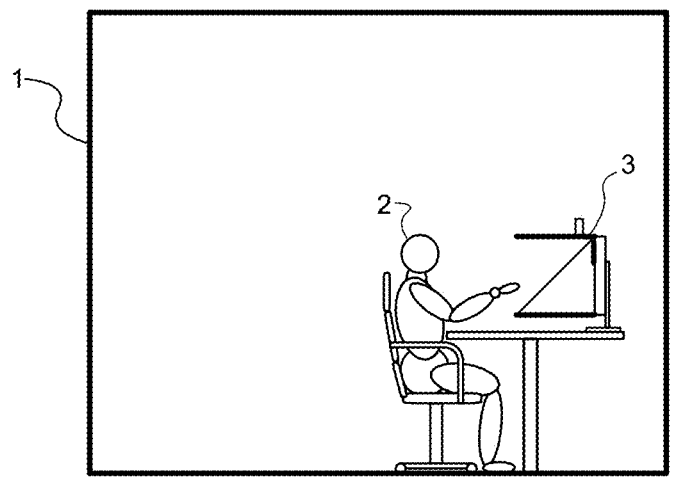
FIG. 1 illustrates a prior art configuration of a side view of a room with a typical telepresence system viewed by a customer.
Figure 2:
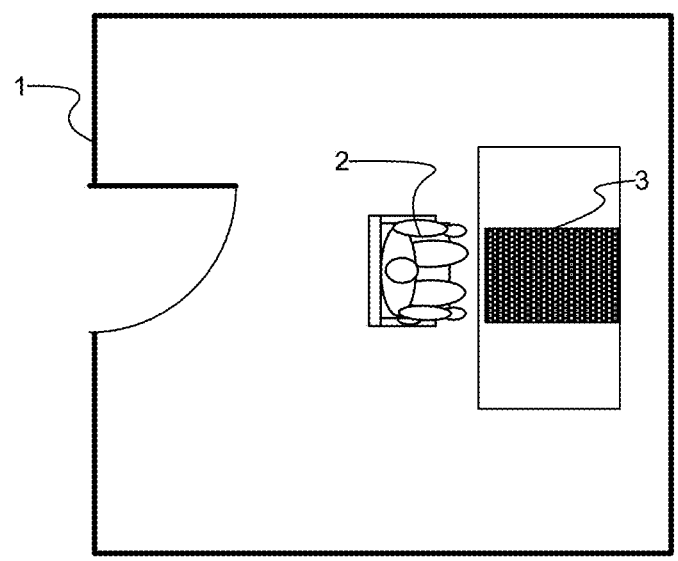
FIG. 2 illustrates a prior art configuration of a plan view of a room with a typical telepresence system viewed by a customer.

Referring now to the drawings, wherein like reference numbers are used to designate like elements throughout the various views, several embodiments of the present invention are further described. The figures are not necessarily drawn to scale, and in some instances, the drawings have been exaggerated or simplified for illustrative purposes only. One of ordinary skill in the art will appreciate the many possible applications and variations of the present invention based on the following examples of possible embodiments of the present invention.

Figure 3:
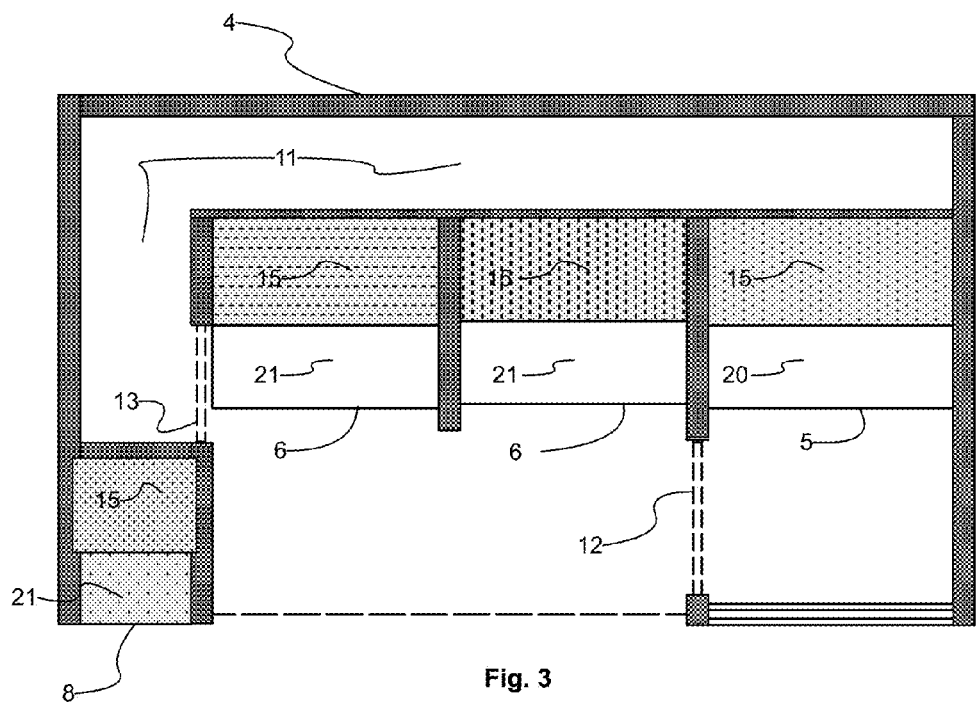
FIG. 3 illustrates a plan view of a Professional Services Terminal with 3D TelePresence Systems

FIG. 3 illustrates a plan view of a compact Professional Services Terminal 4. This terminal 4 may be a self-contained facility occupying an architectural space within a store, shopping mall, public facility, professional services building or other environmentally controlled space that is available to customers. The terminal may be a prefabricated structure that could be assembled on site. The terminal 4 could be a freestanding structure that could towed to a site as a mobile unit.

The terminal 4 may have 3D TelePresence Systems integrated into the interior design, including one or more meeting table configurations 5, one or more standing configurations 6 and one or more kiosk configurations 8. The terminal 4 may have an access area 11 for servicing the 3D TelePresence Systems from the back. A door 12 may be used to close the meeting space with the seated TelePresence System 5 for private meetings. A door 13 may provide access to the servicing area 11. The 3D TelePresence Systems may have a two-way mirror 15 extending the width between two walls with the left and right edges of the two-way mirror integrally mounted into the left and right side walls. The meeting room with the seated configuration 5 may have a tabletop 20 with the two-way mirror integrally mounted in the back edge of the tabletop. The standing configuration 6 may have a countertop 21 with the two-way mirror 15 integrally mounted in the back edge of the countertop. The kiosk configuration 8 may have a countertop with the two-way mirror 15 integrally mounted in the back edge of the countertop.

The interior architectural design will address the acoustics of the total interior space with special consideration to each of the 3D TelePresence meeting spaces. The lighting in each meeting space will be specified to the preferred lux level, color temperature, color rendition index, angle of lighting toward the customers, and positioning for the camera views. Exterior wall surfaces with windows or doors will have a method for blocking or controlling exterior light from interfering with the optimal lighting in the 3D TelePresence meeting spaces. The meeting spaces may have lighting with a color temperature to closely match the color temperature of the image display devices. This matching of the color temperature will help to achieve the perception of the transmitted customer service representative to realistically appear to be in the room. It is commonly known that standard incandescent lighting is typically 3200 degrees Kelvin. By comparison a typical image display device is 5500 to 6500 degrees Kelvin. A person in a room with incandescent lighting will have their eyes adjusted to the warm room lighting, which will result with an image display device appearing to be bluish. However, by matching the color temperature of the room lighting to the color temperature of the image display device, the person will see a person on the image display device appearing to be a natural color. It is recommended that the lighting in the architectural space is set between about 5500 degrees Kelvin and about 6500 degrees Kelvin.

The meeting spaces may be designed to provide optimal acoustic qualities for conducting audio conferencing. This may include the specification of ceiling panels to absorb sound. The floor may be specified to be carpeted to absorb sound. The walls may include acoustic panels to absorb sound.

The Professional Services Terminal may have customer service counters for people to engage in a conversation with a transmitted professional services provider. This counter may function like a teller station within a bank in that there will be a face-to-face conversation. The 3D TelePresence counter may have the ability to dispense cash or complete other transactions. The 3D TelePresence counter will incorporate specialist display technology, but the equipment, such as microphone, speaker, monitor, camera, etc. will not be obviously visible. The customer experience will be the service provider appearing to be life-size and three-dimensionally at the counter while making eye contact with the customer during the two-way communication. The display technology will not be a product that is placed in the architectural space. Instead the architectural structure will be the physical embodiment of the display technology.

A 3D TelePresence Customer Services Counter may be comprised of a counter that is at a standard counter height and is constructed of materials similar to a typical counter in a bank, store or professional services building. Instead of having an area of the floor plan dedicated to a live person working in this space, a two-way mirror may be positioned on the counter on the side across from the customer. This two-way mirror may be angled so that a customer looking forward would see a reflection of the ceiling. In addition to seeing the reflected plane of the ceiling, the customer will see through the two-way mirror to see an image of the customer service representative appearing on a large monitor. The monitor will be immediately behind the two-way mirror and the ceiling will be a distance above the two-way mirror so that the two superimposed images viewed by the customer will display a true depth relationship of the image of the agent in front of a reflected image of the plane of the ceiling.

The service counter embodiment of this present invention is dependent on the architectural design to have specific features to deliver the 3D TelePresence communications experience. In particular, the ceiling performs a function of becoming the plane appearing behind the agent. The ceiling may be close to horizontal with the two-way mirror being close to 45 degrees to result in a reflected plane appearing behind the two-way mirror that is close to vertical. Consequently, the ceiling may be the color, texture, value, and graphic design that meets the visual requirements for the reflected backdrop of the 3D TelePresence System. This portion of the ceiling preferably does not have lights shining downward that would cause a flare of light to appear in the reflected view. Also, this portion of the ceiling preferably does not have air ducts or other architectural features or non-uniformities that would not look appropriate in the reflected view.

The two-way mirror of the service counter embodiment will cover the full width of the counter. Instead of having a two-way mirror that has exposed edges on the sides, the two-way mirror may extend the full width from the vertical surface of the left side to the vertical surface of the right side of the counter. In this way, the left and right edges of the two-way mirror will be extended into the left and right vertical wall panels. This will result in an architectural space where the customer cannot see the edges of the two-way mirror and will only see the surface of the two-way mirror reflecting the ceiling as a backdrop appearing superimposed behind the image on the display device.

Figure 4:
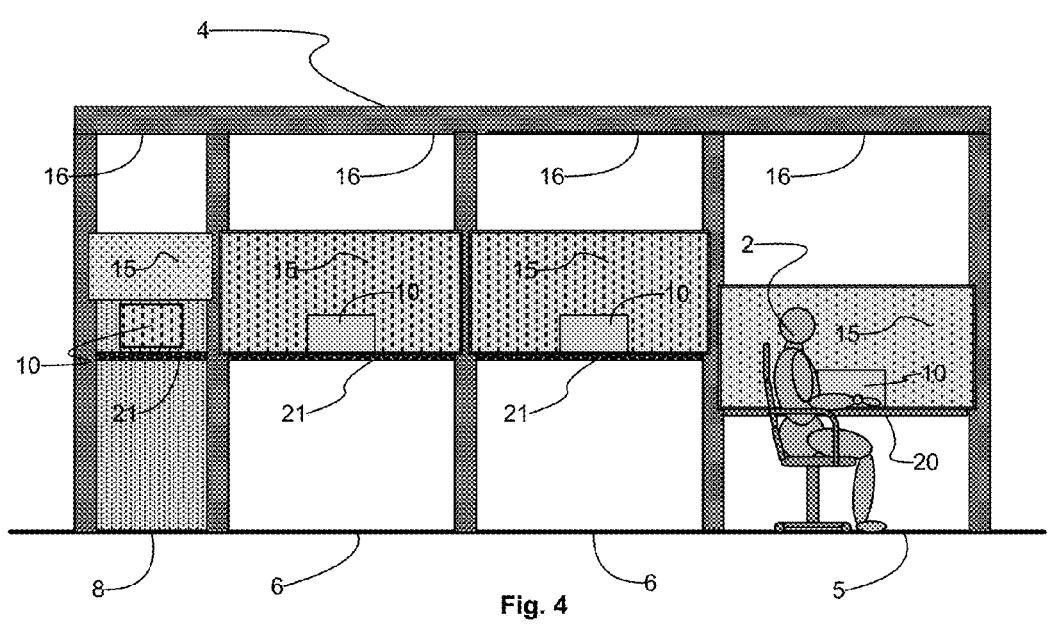
FIG. 4 illustrates a front view of a Professional Services Terminal with 3D TelePresence Systems

FIG. 4 is a front view of a Professional Services Terminal 4. This terminal may have a meeting room for a customer 2 with a 3D TelePresence System in a seated configuration 5 with a desktop surface 20. A two-way mirror 15 has the left and right edges integrally mounted into the walls on the left and right and has the front edge integrally mounted into the back edge of the desktop surface 20. The two-way mirror 15 is angled to reflect the ceiling 16. 3D TelePresence Systems in a standing configuration 6 will have a countertop surface 21. The standing configuration 6 will include a two-way mirror 15 that has the left and right edges integrally mounted into the walls on the left and right and has the front edge integrally mounted into the back edge of the countertop surface 21. A 3D TelePresence System in a kiosk configuration 8 may have countertop surface 21. The 3D TelePresence System in a kiosk configuration will include a two-way mirror 15 that has the left and right edges integrally mounted into the walls on the left and right and has the front edge integrally mounted into the back edge of the countertop surface 21. The two-way mirror 15 may be angled to reflect the ceiling 16. The 3D TelePresence Systems may have a monitor 10 for the remote services representative to remotely display visual content to be presented to the user.

FIG. 5 illustrates a side view of a customer 2 at a 3D TelePresence System in a standing configuration 6 incorporating a two-way mirror 15, image display device 17 reflected ceiling 16 and collaboration monitor 10. The 3D TelePresence System in a standing configuration 6 has an access space 11 behind for servicing.

FIG. 6 illustrates a side view of a customer 2 at a 3D TelePresence System in a kiosk configuration 8 with an image display device 17, a two-way mirror 15, a reflected ceiling formed as a soffit 16 and a collaboration monitor 10. The 3D TelePresence System in a kiosk configuration 8 has access to the electronic equipment through an access panel located below the collaboration monitor 10.

FIG. 7 illustrates a side view of a customer 2 seated at a 3D TelePresence System in a meeting table configuration 5 including a two-way mirror 15, reflected ceiling 16, image display device 17, and collaboration monitor 10. The 3D TelePresence System in a meeting table configuration 5 may have an access space 11 behind for servicing.

Figure 8:
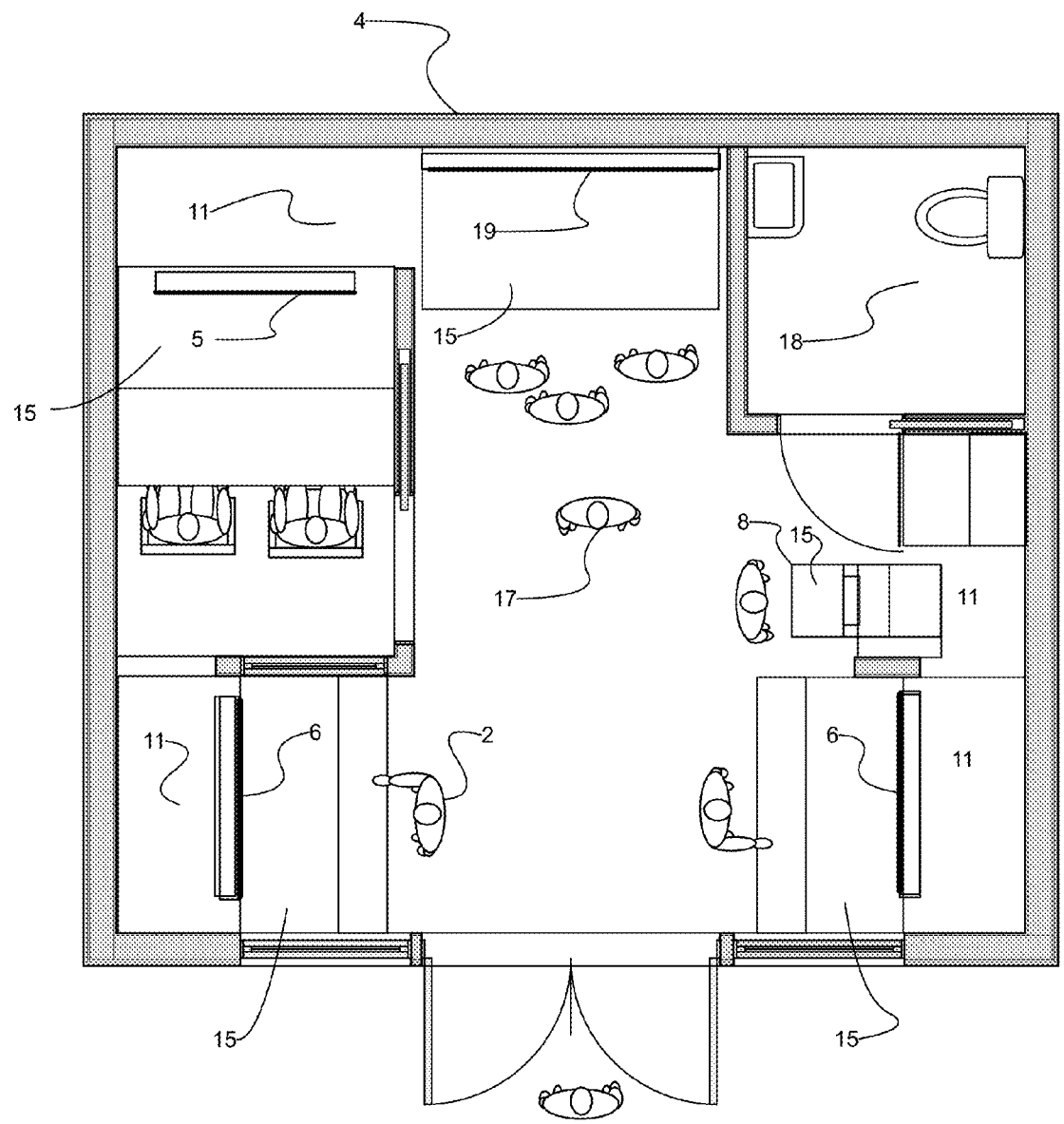
FIG. 8 illustrates a plan view of a Professional Services Terminal with several 3D TelePresence Systems integrated into the architecture of a Professional Services Terminal.

FIG. 8 illustrates a plan view of a Professional Services Terminal 4 in a configuration that may be a free standing building. This terminal 4 may have variations of the number of 3D TelePresence Systems and the interior arrangement of the floor plan. The terminal 4 may have one or more 3D TelePresence Systems in a standing configuration 6, 3D TelePresence Systems in a meeting table configuration 5, and 3D TelePresence Systems in a kiosk configuration 8. The 3D TelePresence Systems may have an access space 11 behind for servicing. The terminal 4 may have a large 3D TelePresence System for group viewing 19. The 3D TelePresence Systems may have a two-way mirror 15 integrally mounted in the walls to the sides of the two-way mirror. The terminal may include a staff person 17 to provide a Concierge role for arranging telepresence meetings for customers 2. The terminal may have a public rest room 18 that may meet ADA standards.

The Professional Services Terminal may have meeting rooms that are architectural spaces to accommodate customers and the appearance of transmitted professional services representative. These meeting rooms will provide a space for the customers that is comfortable for sitting at a table on one side of the room in some embodiments. A two-way mirror on the other side of the table will be angled back from the table at approximately 45 degrees so that a customer seated at the table will see the approximately horizontal ceiling appear as an approximately vertical plane behind the two-way mirror. An image display device or monitor will be positioned directly behind the two-way mirror at a height for a displayed agent on the monitor to appear life-size at eye level with the customers at the table. Since the monitor is close to the two-way mirror and the ceiling is a further distance from the two-way mirror the superimposed image of the agent will appear to be a true distance in front of the reflected ceiling as a superimposed backdrop.

The architectural design of the meeting room may be specific to the function of achieving 3D TelePresence. This may require special placement of lighting to illuminate the customer while not having lights placed in the reflected area of the ceiling. Also, the air ducts may not be in the reflected ceiling area and may be positioned in the walls. The two-way mirror may extend the full width of the room so that the edges of the two-way mirror are not exposed.

The entrance to the terminal may be locked to the general public with access available for members. By unlocking the door with authorization through a card reader or other identification method the members would gain access to the inside of the terminal. The doors may have a button to push to contact a person with the ability to unlock the door. The visiting person may request access to the door and upon approval the door may be remotely unlocked by the authorizing person. Another solution to unlocking a door to the terminal may be a card reader to identify the visiting person. Another solution may be a near field communication device that may be used to unlock access.

Alternatively, the entrance may be open to the public with direct access to a lobby area. The Professional Services Terminal may have one or more staff in the lobby area at a reception desk to greet visitors. The reception role may be given the term, Concierge, since this person will be providing on-site personal support to the customers. The Concierge may welcome the visitors and offer to answer any questions regarding the services provided within the building. The Concierge may offer the visitor a drink and/or a cookie or snack. The Concierge may schedule a telepresence meeting with a professional services provider and show the visitor to the room for the meeting. In addition to a live person on duty at a desk in the lobby, there may be a staff person transmitted to a 3D display system in the lobby to support customers as a 3D TelePresence Concierge. The Concierge desk may have space available for both the live person and the appearance of the 3D TelePresence Concierge. Alternatively, the Concierge desk may have a position for a live person to work and this same space could be transformed into the display of a life-size transmitted 3D TelePresence Concierge when the live person is not on duty.

The space dedicated to the 3D TelePresence Concierge could be used to display a life-size video image of a person appearing at the Concierge desk at all times when it is not necessary to have a live communication with a customer. This recorded image could change to a live 3D TelePresence communication when a customer wants attention. This change from the recorded image to the live 3D TelePresence communication may be triggered by a proximity switch that senses a visitor coming close to the Concierge desk. Alternatively, the visitor may interact with a touch screen to select pre-recorded responses to frequently asked questions or to select to initiate a telepresence communication with a 3D TelePresence Concierge.

As an example the process of delivering banking services may have the following sequence of actions. A 3D TelePresence Concierge may be transmitted from their work location using a network connection and a video routing system. The video routing system may connect to the workspaces of the 3D TelePresence Concierge staff, which may be within a video call center at a central location or many individual locations. The 3D TelePresence Concierge may perform the same functions of the live Concierge, including welcoming visitors, answering questions, scheduling meetings, remotely opening doors to meeting rooms and even offering drinks and cookies through remotely controlled dispensing machines.

The 3D TelePresence Concierge desk can also provide advantages that are not possible with a live person on duty. A live person will need to step away from the desk for breaks during the day, which would leave the Concierge desk unattended. The 3D TelePresence Concierge will have the flexibility to route the video call to another available 3D TelePresence Concierge as needed without delay. The live person may not have answers to all questions asked by the visitors, whereas the 3D TelePresence Concierge could advance the TelePresence communication to a specialist to address the visitor's question. The live person may not speak the language of the visitor, whereas the 3D TelePresence Concierge could forward the video communication to a person speaking the language of the visitor.

One of the advantages of the present invention is that the Professional Services Terminal could be available 24 hours a day throughout the year without the dependency of staff on duty every hour. The architectural design of the terminal may embody security features to protect the equipment in the building while still providing access to the professional services for recognized members. In particular, the electronic equipment and display technology may be securely positioned behind the two-way mirror. The two-way mirror may be laminated to make the glass a secure impenetrable panel to protect against theft of valuable equipment. In addition to the installation of security cameras in the architectural space, the appearance of a life-size person displayed three dimensionally in the terminal would deter vandalism. During off-peak hours the person appearing in the main lobby could be a recorded image of a security officer with the capability of pre-determined security parameters in place to trigger the recorded image to be replaced with a live telepresence communication with a security guard. The telepresence security guard could remotely trigger audio alarms, security lights, door closures, security camera recording, and other security functions as needed.

The Professional Services Terminal may have a 3D TelePresence Global Theater that would have a large screen within a room large enough for a group of people seated and/or standing to view the display. This architectural space may have a two-way mirror positioned at approximately 45 degrees angled back from the audience area to reflect the ceiling. The ceiling may be a have an image from a projector projected on it so that the reflected images appears as a reflected backdrop. The projected image on the ceiling may appear as a scene of a remote location. Since a large monitor will be directly behind the two-way mirror and the ceiling may be further from the two-way mirror, the superimposed image of people on the monitor and the reflected backdrop will produce a true depth of the displayed people in front of the reflected backdrop. One skilled in the art will recognize the inclusion of a projected image on the ceiling could be employed in other embodiments (e.g., kiosk embodiment, counter-top embodiment, table embodiment, etc.) described herein. The two-way mirror may be the width of the stage area with the left and right edges of the two-way mirror extending to the side walls of the stage. In this way the left and right edges of the two-way mirror will be hidden within the side walls. In order to accommodate more people in the audience area, the seating area may be wider than the stage area.

The 3D TelePresence Global Theater may be connected by a network to another Professional Services Terminal for audiences in each location to have live telepresence communication. This may be used by community organizations to conduct meetings with groups in other cities from around the world. It may be used by educational institutions to conduct courses to classes in the towns of the terminals. It may be used by government agencies to inform citizens.

The Professional Services Terminal may be a combination of 3D TelePresence Customer Service Counters, 3D TelePresence kiosks, 3D TelePresence meeting rooms and a 3D TelePresence Global Theater.

Figure 9:
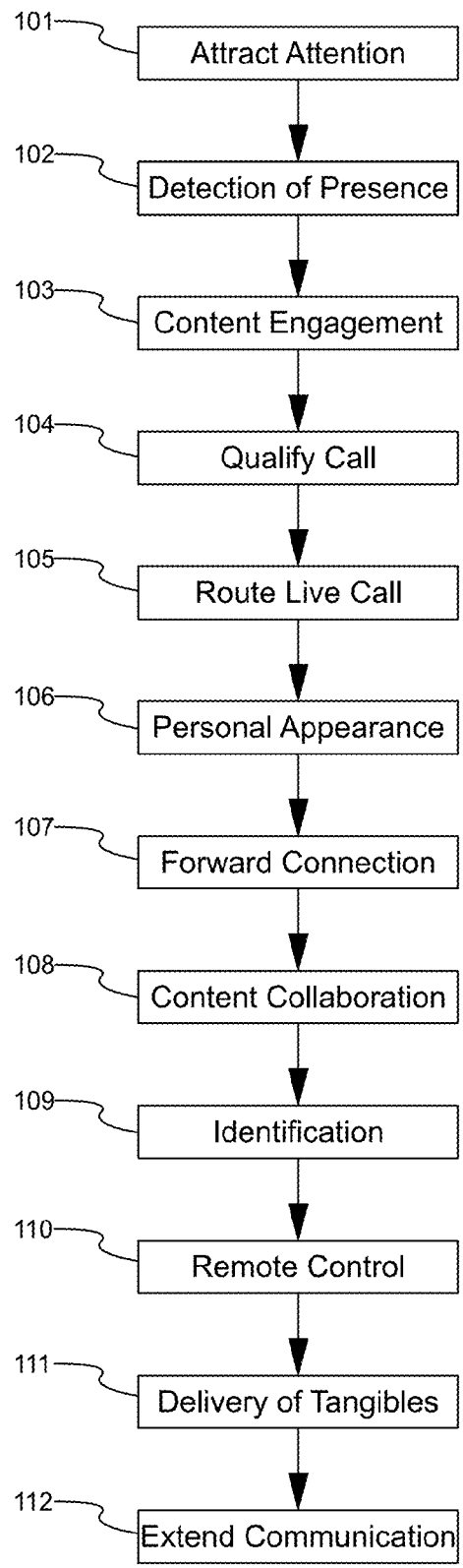
FIG. 9 illustrates a process for delivering professional services with 3D TelePresence Systems without the requirement for onsite staff support.

FIG. 9 illustrates one process for communication between a customer and a representative based on an unmanned 3D TelePresence System. In this process the 3D TelePresence System may be placed in a location that may be accessed by potential customers. The customers may have free access to the 3D TelePresence System and may begin to interact with the system without requiring any involvement of an on-site supporting staff member.

The process for delivering professional services using the above described 3D display system may be embodied in the following twelve steps:

Step 1 is to "Attract Attention"—101

The 3D TelePresence System may incorporate a display device incorporating a two-way mirror to achieve a three dimensional effect through an embodiment as previously described in FIGS. 4 through 8. The three dimensional video content may be within view from an area where potential customers may be present. This 3D TelePresence System may be large enough to present an image that can be clearly seen by the potential customers. The 3D visual content may be bold graphic imagery that is supportive of the professional services promotion to the potential customer. By way of example, a 3D computer graphic depicting a competitive interest rate for a car loan may be appropriate for a bank promoting loan services while a feature of a recent medical advancement may be appropriate for a medical services provider. The 3D visual content may be colorful, high definition, and animated with fast movement to catch attention.

This three dimensional effect may be more compelling compared to flat images displayed on standard flat screen displays. This 3D visual content will continue to run during the hours when people will be present within the area in view of the 3D TelePresence System.

The 3D visual content may be a loop of video that repeats throughout the day and night. Alternatively, the 3D visual content may be programmed to present different content throughout the day and night, such as specially produced video segments with targeted messages relevant to the time of day for the morning, lunchtime, afternoon, end of workday, evening and night time, as examples.

The 3D visual content may be a live video transmission of a sales person appearing on the 3D TelePresence System. The sales person may see potential customers from their remote location of transmission and respond with a request, such as "Hi. You ought to take a look at this" or may wave to the passing customer.

The 3D visual content may come from a digital media player, computer or other programmable device with saved video files. These files may be updated by replacing a memory stick, USB flash drive or other device containing digital video files. The digital media player may be connected by Ethernet, wireless reception or the like to an IP network so that new video files could be remotely downloaded to the digital media player from a computer at the location of the content producer.

The 3D TelePresence System may include a second monitor. The second monitor may be positioned in front of the two-way mirror to be at a height for a person to touch the monitor. The second monitor may have a touchscreen surface. This second monitor may attract attention of potential customers by displaying visual content of interest. This visual content may change in synchronization with the 3D visual content on the primary image display device of the 3D TelePresence System. The second monitor may provide touchscreen buttons to provide options for the customer to select video content, product information, answers to frequently asked questions and other topics. The touchscreen may have a button to initiate a transmission to a live sales representative or customer services representative.

The 3D visual and audio content may be generated in real time and displayed as it is generated for the 3D TelePresence System. The real time content may be generated by a computer in the 3D TelePresence System or by a computer or image generation device networked to the system and displayed immediately as it is generated. The real time content may be produced based on parameters that are set to meet specific objectives for attracting attention to the 3D TelePresence System. The real time content may be computer graphics, 3D animation, life-like avatar, or similar video and audio segments.

Furthermore, the 3D visual content may be a live feed over a network from a service provider delivering sources of international news, stock prices, local events, daily specials, social media and other topics of interest to the potential customers in the area. This 3D visual content may be programmed to be unique to the interest of customers in the area of the TelePresence System. In particular, the 3D visual content may be related to financial services for a bank or may be medical content for a medical services provider.

The 3D visual content may be managed by a media network company to include paid advertising to be transmitted to the display device of the TelePresence System. The media network company may generate income from advertisers for the exposure that they could provide by showing video and audio advertising on the 3D TelePresence Systems. The income generated by the media network company from advertisers could offset the cost of the equipment and operational costs of placing the 3D TelePresence Systems in public locations. The media network company may enter into a leasing program with a financial institution to cover the capital expenditure of the 3D TelePresence Systems and offset the leasing costs with income from advertising companies under contract for placement of advertising media to be presented on the 3D TelePresence Systems. The 3D TelePresence Systems may be placed in strategic locations, such as financial institutions, medical facilities, pharmacies, community centers, shopping malls, etc. at no cost to the companies providing for the placement of 3D TelePresence Systems in their locations. The company providing the space for the placement of the 3D TelePresence System may generate income from delivering professional services and/or sales of their products or services.

The 3D TelePresence System may display the advertising media for all or most of the time when it is not being used by a customer for a live 3D TelePresence call. The 3D TelePresence System may incorporate a sensing device to validate the presence of a potential customer and a video management software on a server in a data center to document the presence of a customer in the observation zone while advertising media is viewed by the customer. The advertising company may be charged based on the documented presence of the customer observing the advertising media running in their presence.

As an example, a 3D TelePresence System placed in the lobby of an upscale financial institution could generate income from showing video advertising of upscale products, such as luxury cars, jewellery, high priced real estate, exquisite apparel, etc. This advertising could include promotion of professional services, such as wealth management firms, legal partnerships, real estate agencies. The financial institution could generate income by delivering paid professional services or signing up customers to loans or other financial services.

As another example, a 3D TelePresence System placed in a medical institution or a pharmacy could show video advertising, such as new medications, cosmetics, treatments, medical products, etc. This advertising could include promotion of professional services, such as dental offices, clinics, hospitals, consultants, etc. The medical institution or pharmacy could generate income by delivering medical services for patients or approving prescriptions for customers.

As a further example, a 3D TelePresence System placed in an airport could show video advertising, such as hotels, rental cars, vacation holiday packages, restaurants, entertainment, etc. This advertising could include promotion of professional services, such as banking services, credit card services, travel agencies, dating services, etc. The travel companies could generate income by getting payments from customers for their services.

Step 2 is "Detection of Presence", 102

The 3D TelePresence System may incorporate technology that will detect the presence of a potential customer. This method includes a step in the process whereby the presence of a potential customer triggers a change from the aforementioned video content to an initial visual image or audiovisual program to begin an engagement with the customer. This detection of the presence of the customer may be a physical button that is touched to trigger the response. As an example, a large red button with text saying "Touch Here" could be placed in an obvious position to be easily seen by a customer approaching the TelePresence System. By pushing on the physical button a relay would trigger a computer or programmed device to switch the video content to new content in response to the action taken by the customer.

Another method of detection of presence may be the usage of a touchscreen monitor with a display of a "Touch Here" image that is programmed in the connected computer to respond to the physical touch of the area of the displayed button on the touch screen to trigger the new content.

Another method of detection may be the physical presence of a customer in close proximity to the 3D TelePresence System. This detection method may be a simple motion detector that senses movement in close proximity to the 3D TelePresence System. A floor mat with internal sensors to detect the weight of a person could be placed in the area in front of the 3D TelePresence System so that a person stepping on the mat would trigger a change to the visual content. The method of detection could utilize a laser beam, infrared light or other electronically generated transmission that would be blocked by a person who moved into the path of the transmission to trigger the presence of the person.

A further method of detection would be the usage of a proximity switch that emits an electronically generated signal that will reflect off an object in its path to be received by a receiver. The proximity switch triggers when the reflected signal is within a predetermined distance. This method has the advantage of being specific to determining when a person is within the optimal distance for triggering the visual and audio content of the 3D TelePresence System.

When a method of detection is triggered by their proximity to the 3D TelePresence System and does not require that the customer take any action to trigger their presence, this opens up the opportunity to present a message to the customer to encourage their engagement. As an example, a customer coming in close proximity to the 3D TelePresence System could trigger a video with a message, such as "Hi. Thanks for taking a look at our service. We are ready to tell you about our professional services. Make a selection on our touchscreen to find out more."

Another method of detection is through video recognition. A 3D TelePresence System has a camera that is required for the live video communication. This same camera or another dedicated camera may view the area where customers may approach the 3D TelePresence System. The camera may be connected to a computer or specialist programmer that has an application for evaluating the incoming video image. This video evaluation application may recognize when there is movement in the image area to trigger a response. More advanced video evaluation capability may be able to recognize an image of a person, as compared to a motion detection sensor that is triggered by any movement. It may be possible to use a video recognition system to determine the presence of a person moving into the area in front of the 3D TelePresence System to trigger a predetermined visual content response. Furthermore, this same video recognition system may be programmed to determine further responses based on the length of stay in the viewable area.

More advanced video recognition technologies may be used to provide a wide range of visual content responses. Video recognition technologies exist that have a good reliability in predicting the gender, age and ethnicity of a person. This prediction could be used to trigger visual content that would have a likelihood of being appropriate for the person in close proximity to the 3D TelePresence System. This profile could be helpful in presenting the promotional message that could generate the most successful response from the potential customer.

As an example, a video recognition solution may identify a woman within view of the 3D TelePresence System and present a video to gain attention, "Here is a dress that you would love". If a may was identified the system may present a video "This is a suit that would look handsome on you".

Step 3 is "Content Engagement", 103

Once the 3D TelePresence System has detected the presence of a person, the next step is to get that person engaged in the content related to the promoted professional service. As an example, a 3D TelePresence System promoting a financial institution may present the potential customer with choices for finding out more information about loan services, such as mortgages, car loans or improvement loans, whereas a 3D TelePresence System promoting medical services may present choices for prescriptions, counselling services or medical procedures. These choices may be displayed on a touchscreen or other interactive device within easy reach of the customer.

Selected choices for content may trigger the computer or content management device to play a video relevant to the selected professional service. The touchscreen may continue to display all the options of choices of topics or may change to provide supportive visual content for the selected topic. Following the completion of a video of a selected topic the touchscreen may display the original selection of options or may advance to a second level of options branching out to related topics from the original selection. The touchscreen may be an interactive program on the computer within the 3D TelePresence System or networked to a server at a data center with an elaborate branching to delve into detail regarding the featured professional services.

The 3D TelePresence System may be connected to a server at a data center to access a website or interactive program hosted on the server. The touchscreen may display the selection of content that resides on the server. In this way it may be possible to have hundreds or thousands of 3D TelePresence Systems in locations nationally or internationally that will always be up to the minute with the latest content for selection in each location.

In addition to the selection of content by interaction with a touchscreen the 3D TelePresence System may have a capability for voice recognition. This type of technology has been commonly used with automated phone response solutions. Since each 3D TelePresence System will already have a microphone and speakers for the live telepresence communication, this equipment could also be used for communication with the visual content programs using voice recognition. This would provide the customer with the option to ask a question related to the promoted professional services. Pre-recorded audio and video responses could be prepared for frequently asked questions. These responses could be presented by the display of pre-recorded video segments shown on the image display device of the 3D TelePresence System at life-size in 3-D with perceived eye contact in the form of a lifelike avatar.

Furthermore, the responses of the lifelike avatar may be generated in real time through an artificial intelligence application to understand questions from a potential customer and to present a full motion life-size computer generated image of an avatar appearing to have eye contact while delivering a live response to the customer's question.

Further advanced video recognition technologies use a specialist camera system to focus on the eyes of a person to monitor where they are looking within the viewing area of a 3D TelePresence System. As an example, a 3D TelePresence System may display different images on the left and the right of the image display device. The eye monitoring device would detect if the person was looking to the left or the right. If the person was looking to the left for a predetermined period of time, the application could trigger the computer to switch to a visual content associated with the topic of the image on the left. This provides a method for a customer to be presented with a series of visual presentations without needing to physically touch any components of the 3D TelePresence System.

Step 4 is "Qualify Call", 104

Once the potential customer has engaged with the content, he or she may want to have a live call with a professional services representative. It may be possible to have a button on the touchscreen or other readily available method for initiating a live call. While there is the possibility of providing potential customers with easy access to professional services representatives, there is a tangible cost to supporting this video communication service. Therefore, it may be advantageous to determine if it is worthwhile to incur the expense of undertaking a call with the person wanting to make a live video call.

One method for qualifying a call is to make the live call button only available once a person has completed a set of qualifying questions that may be presented on the touchscreen. As an example, a financial institution may not offer a live call to a person seeking a personal loan, however may offer a live call to a person seeking a business loan. Also, a medical institution may not offer a live call for a person seeking to purchase an over-the-counter drug, but may offer a live call to a person seeking an expensive medical procedure.

Another method for qualifying a call is to ask the person to swipe their insurance card or bank card. As an example, a person seeking medical advice would need to have insurance with a company that was providing customer services through the 3D TelePresence System. Also, a bank could identify their customers from the bank card and may offer the telepresence service to all of their customers or may offer this service to customers with predefined financial requirements.

Another method for qualifying a call is to have a charge for the placement of the call. This may require that the person swipes a credit or debit card for an approval for a payment for the call. Payment methods may involve Apple Pay, NFC readers, or other payment devices.

Another method for qualifying a call is to offer the live video based on the progress of a person going through the process of ordering a product or service. As an example, a person going through the procedure of placing an order may take an unusually long time at one step in the process. It may be helpful for this person to speak with a representative to complete the transaction.

An important aspect of qualifying a call is to confirm the language that the customer speaks. In some parts of the United States it is common for a professional service provider to offer an option for communication in either English or Spanish. It may be possible to provide buttons on the 3D TelePresence System to select either English or Spanish.

A more advanced method for determining the language of the customer may be an speech recognition system using the microphone and computer in the 3D TelePresence System to listen to the customer speaking. The speech recognition system could determine the language being spoken and an audio response would be played on the speakers to give the customer the opportunity to confirm that the right language had been selected. The language detection software may be capable of detecting over one hundred languages. Since it may not be practical for the professional services provider to have representatives supporting all the languages, it may select to use a language translation service.

A method for using a language translation service with a 3D TelePresence System is to have a translator join the call during the video transmission between the customer and the representative. Assuming that the customer speaks a foreign language and the representative speaks English, the audio of the voice of the customer speaking the foreign language with be directed to the translator and muted to the representative. The translator hears the foreign language of the customer and translate it in real time to English. The audio of the spoken English translation is transmitted to the representative. When the representative responds in English the audio is transmitted to the translator and muted to the customer. The translator translates the English to the foreign language in real time and transmits this to the customer. In this way the customer sees the representative speaking on the 3D TelePresence System while hearing the translation in the foreign language. The representative sees the customer speaking and hears the translation in English. This technique may be delivered using a live translator performing the service or this technique may use a computer translation capability for the real time translation.

Step 5 is to "Route Live Call"

One method for routing a call from a 3D TelePresence System is to direct all calls to a common answering service. This will require that the incoming call is directed through a video enabled Automated Call Distribution (ACD) solution with the functionality capable of forwarding the incoming video call to the next available representative. Routing video requires a more advanced capability than typical audio routing used in call centers. Specialized video routing has been developed but this technology is not as commonly available as audio call routing. It may be necessary to develop and refine custom capabilities that meet the requirements of the professional services provider.

Another method for routing video calls to the right representative is to narrow down the selection prior to placing the call. The touchscreen of the 3D TelePresence System could have a number of choices available for the customer. As an example, a financial institution may provide choices for loans, wealth management, and other services. A selection of the category for loans may bring up another set of choices for car loans, mortgages, personal loans and other loans. A person selecting a choice for a car loan will be connected to the next available financial officer for car loans. In this method the customer is connected directly to the financial specialist for the service that they want. In a similar method a medical institution could provide a series of choices to direct the customer to a representative for the professional medical service of their choice.

Since it may be impractical to have representatives available in all categories at all times, it may be advantageous to use a technique for making the call buttons available on the touchscreen of the 3D TelePresence System only when there are representatives available at that time. In this way there will not be a customer disappointed by touching button to connect to a representative and finding out that a representative is not available. In an implementation of video call capabilities to 3D TelePresence Systems for professional services, such as financial institutions and medical institutions, it may be essential to have the call routing service managed from a secure data center. This may be supported by servers in multiple data centers to provide redundancy.

The routing of the video calls managed by an application within the servers at the data centers will require a routing hierarchy. This may involve that each video transmission system equipped to capture the image of a representative may need to be registered with the call management system and the representative must be logged in to establish the service availability. Each registered transmission system would be assigned with the specialty of the representative using that system at that time. The call management system would provide the overall capability to route incoming video calls to the next available transmission system with the representative for the specific need for that call.

Step 6 is "Personal Appearance", 106

An advantage of this process is the ability for a customer to come face-to-face with a professional services representative who appears predominately life-size on 3D TelePresence System with eye contact and a realistic sense of presence. The advantage of the proceeding steps of the process is the streamlining of the selection process so that the customer is engaged with the right representative as quickly as possible. It is the personal connection that in part differentiates this 3D TelePresence communications solution from other audio, chat or web communication.

While the advancement in communication over the Internet has provided multiple business processes to be conducted electronically, there are some professional services that people prefer to have with a personal connection. As an example, a person with a life threatening illness may want to have a serious conversation with a specialist about a possible procedure. Even though it may not be possible for the medical professional to be physically in the same room, the sense of presence that can be achieved with a 3D TelePresence System may help to provide the sense of confidence that is essential. Also, a financial institution that is providing wealth management to a valued customer may want to show their personal commitment and engender a sense of trust with the handling of significant sums of money.

All of the steps of this process contribute to the success of the communications experience. However, it is this step of the display of the professional services representative at life-size with eye contact that is a proprietary advantage over other video conferencing or electronic communications solutions. The 3D TelePresence Systems that include the three dimensional sense of presence extend this personal experience to feel as close to a physical presence as possible.

This added value of a more personal experience provides for the opportunity to charge a higher price for a professional service compared to standard video conference or webcam communications. It may be possible to charge for the time of professional services provider at a rate that is the same as meeting physically in person in the same location. This capability of charging a full rate for time without incurring the costs of travel to customer sites may result in higher productivity for the company and less demand on the time of the professional services provider.

Step 7 is "Forward Connection", 107

In conducting business in the professional services sectors there may be a method for forwarding the communication from an initial representative to another professional. In some cases, the initial representative may fill a role of engaging the customer in a conversation regarding their needs and interest with the objective of forwarding the call to a specialist that would be most appropriate. This forwarding of the call may require a video management system that provides real time availability of the professionals currently available and a method for transferring the video connection. This video management system could operate on a national or international basis with a central monitoring of all participants. The method for forwarding the communication from the initial representative to another may need to be both reliable and simple. It may be implemented by the initial representative without requiring technical support or a time consuming process.

Step 8 is "Content Collaboration", 108

The 3D TelePresence System may have both an image display device for the display of the remote representative and an image display device for collaboration. The image display device for the collaboration may be within reach of the customer and may have a touchscreen capability. This collaboration touchscreen may display an interactive program that may be used by the customer.

The computer for the customer's image display device may be connected by a network with access to the computer used by the representative. A screen sharing application may be used by the representative to view the image displayed on the customer's screen. The screen sharing application may be TeamViewer, Join.Me, Screenhero, Mikogo, Screenleap, BeamYourScreen, SharedView, CrossLoop, Screen Connect, or any other application with the capability of viewing and controlling a remote computer. With a screen sharing application the representative may select to display photographic, graphic or text files that may be on the customer's computer. Alternatively, the representative may access image files and data files from a server to be displayed on the customer's screen. This will allow the representative to present relevant content to be viewed by the customer. As an example, a representative from a financial institution may select to display visual content about a number of loan services. The representative will be able to talk about the loan services while showing the customer the details of the loan services on the customer's screen. As a further example, a representative of a medical institution may select to display information about medical procedures.

The network connection between the representative's computer and the customer's computer may be over the Internet. This network connection may use encryption for security. Alternatively, both the representative's computer and the customer's computer may be on a closed and secure network that has no or restricted access to the Internet. With both computers on a closed network it will be possible for the representative to securely access confidential files and share the appropriate information with the customer. As an example, a banking representative could access a banking customer's account information and share this with the customer. Also, a representative of a medical institution could access patient records and share this information with the patient.

Another method for network access to the 3D TelePresence System is to have the live video communication between the representative and the customer to be on the Internet while the collaboration between the computers on both locations are on a closed network. This has an advantage of the video being transmitted on an inexpensive connection to the Internet. Furthermore, it would not impose a bandwidth requirement on the organization's financial services network or a medical services network. This addresses the requirement of financial and medical institutions of keeping records securely separate from any access to the Internet. The video communication does not need to be on the same network since it is only a conversation without the transmission to confidential records. However, both the representative and the customer use separate computers on the secure network with screen sharing software to view the confidential information on the collaboration monitor without this being accessible over the Internet.

In addition to providing the representative with access to the customer's computer for displaying relevant visual content, the screen sharing application will allow the representative to view any keyboard, mouse or touchscreen interaction by the customer. As an example, the representative may select to display a form to be filled out by the customer. The customer could use a keyboard, mouse or touchscreen to make selections and type in information. The representative could view this form while it is being filled out by the customer. This will allow the representative to quickly respond to any errors in the process or to provide answers to questions as they may be needed.

Step 9 is "Identification", 109

Before the representative would proceed with sharing confidential information or completing a legal or financial transaction, it may be necessary to confirm the identification of the customer. One method for identification is for the customer to swipe their banking card or medical insurance card in a card reader connected to the computer in the 3D TelePresence System. Another method is for a card scanner to be connected to the computer so that the customer could scan a driver's license, insurance card or other identification document.

The representative could have access to other devices for identification of the customer. This could be a fingerprint scanner. The customer's computer could have a keypad for the input of a numeric code.

The 3D TelePresence System has a camera and microphone that can be used for identification. The camera could be used with a facial recognition application to identify a customer. The microphone could be used for voice recognition.

Step 10 is "Remote Control", 110

Since the representative appearing on the 3D TelePresence System has remote control of the customer's computer using a screen sharing application, the representative could remotely access and control peripheral equipment connected to that computer. A document scanner could be connected to the computer at the customer location so that the customer could transmit a document to be viewed by the representative. The document scanner could be the size to scan a prescription, receipt, order form or other small document. The scanned document could be viewed by the representative as a record to be saved on the server and as a confirmation of a transaction, such as filling a prescription, crediting a refund, confirming an order or other action.

The document scanner could be the size to scan a full size legal document. The representative could view the scanned document and save it on the server for future reference. The document could support a legal process of proceeding with a financial transaction or a medical procedure. As an example, the document could be the title to a car, a mortgage document or a business registration that would be required to be on record prior to proceeding with a loan. In another example, it could be a medical record, lab results or insurance claim that would be required prior to proceeding with a medical procedure.

For a medical application the customer's computer could have medical devices connected to it. A digital stethoscope connected to a computer at a medical facility could be used by a nurse to be placed on a patient for the audio signal of the heartbeat to be received by the computer and heard by a physician with the computer using the screen sharing application. A medical exam camera could be connected to the computer in a medical examination room for a nurse to direct the view of the camera to an area of interest for the examination. In this way the image of the patient could be viewed from a computer remotely accessing the computer in the exam room. The medical device could have a specialist application, such as an otoscope, dermascope, laryngoscope, nasolaryngoscope, EKG system, blood pressure cuff, ultrasound probe, spirometer, etc. The medical devices could be connected to the computer through control cables or could be connected by a wireless or Bluetooth signal.

The customer's computer could have a digital signature pad connected to it. This would provide a means for a customer to sign a document. As an example, a financial institution could present a loan document to a customer. Upon review of the document the customer could sign the document for a legal acceptance of the terms of the document. As another example, a medical institution could display a medical approval form for a procedure and the patient could approve the procedure by signing on the digital signature pad.

Step 11 is "Delivery of Tangibles", 111

The 3D TelePresence System may have peripheral equipment connected to the computer that would provide a representative with the capability of delivering tangible, physical results to the customer. The computer in the customer location could have access to a printer directly connected to the computer or a printer in close proximity that is connected to the computer by a wireless or wired network. As an example, a representative of a financial institution could access the printer to print out promotional literature or could print out a signed loan agreement for their customer. As another example, a representative of a medical institution could print out a patient's medical records or a completed form with the patient's signature.

In a financial institution, such as a bank or credit union, the customer's computer could have devices to support financial transactions. The computer could have a custom printer to produce a cashier's check. The computer could control a cash dispenser for bills and/or coins. The computer could be connected to a cash receiver for bills and or coins. The computer could be connected to a change maker. The computer could be connected to device to deposit checks and print out a receipt. With these devices a representative of the financial institution could talk with the customer to find out what transaction they want. Once a customer's identification is completed the representative could remotely control the equipment connected to the customer's computer to complete the financial transaction. The customer's computer and the 3D TelePresence System may be in a configuration that may appear to be similar to an ATM or teller window.

In a medical application the medical representative on the 3D TelePresence System may print out a prescription for the patient. The 3D TelePresence System may incorporate a dispensing machine that would dispense the prescribed medication for the patient. In a general application, the 3D TelePresence System may dispense products, such as electronic equipment, cosmetics, jewelry, watches, etc.

Step 12 is "Extend Communication", 112

The 3D TelePresence System may be effective in establishing a business relationship with a customer. Unlike common communication through electronic media, such as websites, emails, web chats, text chats, etc., the personal connection between the customer and a representative appearing to be present for a face-to-face interactive communication in real time may engender a loyalty and trust. This personal connection may evolve into a relationship that a customer may value as he or she continues to seek the professional services provided by the representative. In this regard the customer may want to maintain this personal connection.

The 3D TelePresence System may support the extension of communication beyond the initial face-to-face meeting. The system may have the capability of printing out a business card and promotional literature for the customer to take away as reference for reconnecting in the future. This printed material may provide other means of access in the future, such as phone number, email address, website and social media.

The 3D TelePresence System may display a QR code for the customer to capture on a mobile device. Other methods of capturing information using NFC or other communication techniques may be used. The established connection through the QR code or other method will establish a link to a website or application that will provide further information and services to the customer through the mobile device. Once established with the connection the customer can make payments on the mobile device for products and service presented on the 3D TelePresence System.

The customer may capture the image of a QR code or use other communications technology to gain access to a video management solution that will establish a method for the customer to communicate with other video enabled devices beyond the 3D TelePresence System. This method would allow a customer to reach the professional services provider in the future through other devices, such as a personal computer, laptop, tablet, smart phone or other electronic device. This method of access may provide the customer with an application to provide control of the content displayed on the 3D TelePresence System. In this method the mobile device of the customer will operate in a similar manner as a remote control of the content on the 3D TelePresence System.

Figure 10:
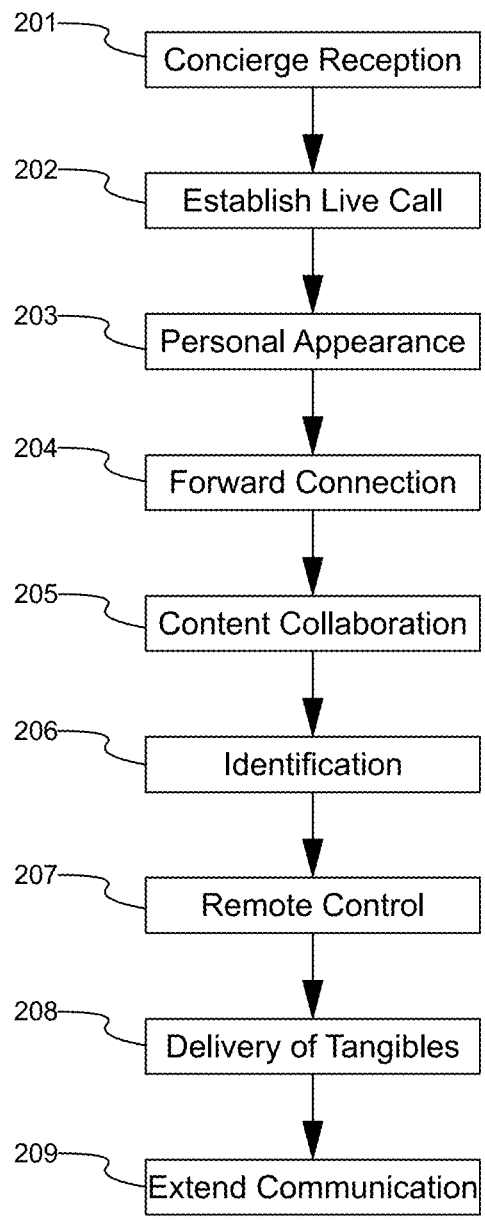
FIG. 10 illustrates a process for delivering professional services with 3D TelePresence Systems with onsite staff support.

FIG. 10 illustrates a method for a staff person to perform the role of receptionist or Concierge in an architectural scale communications system, which may be called a Professional Services Terminal. This process for managing 3D TelePresence Systems within a Professional Services Terminal may involve the following nine steps:

Step 1 is "Concierge Reception", 201

The staff person assigned to this role may have a position within the lobby area of a Professional Services Terminal. The person may greet visitors as they enter the Terminal. The term "Concierge" may be used for this position since it is associated with making arrangements for services for their customers. This Concierge may have the role of scheduling 3D TelePresence sessions with professional services providers. When a visitor arrives the Concierge will ask how he or she could help them. If the visitor has arrived for a pre-scheduled telepresence appointment the Concierge will confirm the appointment. The Concierge may offer visitors a drink or snack and offer a place for the customer to sit prior to a scheduled telepresence session. At the scheduled time the Concierge may escort the visitor to the appropriate room.

The role of Concierge may be performed by a staff person located at a remote location with a transmission system to transmit to appear at a 3D TelePresence System positioned in the lobby area of a Professional Services Terminal. The remote person would appear as a 3D Concierge. The 3D Concierge would perform the same functions as a live on-site Concierge, including greeting visitors, scheduling telepresence sessions, confirming appointments and offering a drink or snack through a remotely controlled dispensing device.

The remote 3D Concierge may unlock doors to meeting rooms for visitors.

Step 2 is to "Establish Call", 202

3D TelePresence sessions could be arranged online through a website provided by the company operating the Professional Services Terminal. This website could have a scheduling program that would list the available professionals with their schedules. It may also list the TelePresence rooms at a selected TelePresence Terminal with their available times. A request for a professional services provider could be matched with an available room at a selected Professional Services Terminal. Once this meeting is scheduled a managed video solution could initiate the call at the scheduled time without requiring any action to be take by the representative or the visitor.

A visitor arriving at a Professional Services Terminal without a scheduled meeting would talk with the Concierge or 3D Concierge to request a meeting. The Concierge or 3D Concierge would be able to view the schedules of the professional representatives and reserve a room at a time when it is available.

The following steps 3 through 9 as shown as 203 through 209 may be similar to the previously presented method in FIG. 9 shown as steps 106 through 112.

What is claimed is:

1. A method for use of a communications system, comprising:
    displaying video content on an image display device that is observable by a customer within an observation zone through a two-way mirror positioned between the observation zone and the image display device, with the two-way mirror angled at approximately 45 degrees to reflect a backdrop positioned a further distance from the two-way mirror than the image display device so that the customer in the observation zone will view the video content as three dimensional imagery, through the two-way mirror that superimposes a depth relationship on the video content relative to the backdrop, the video content including preselected video content;
    capturing a video image of the customer in the observation zone with a camera;
    capturing a voice of the customer in the observation zone with a microphone;
    projecting audio with a speaker into the observation zone that is observable by the customer within the observation zone, the audio including preselected audio content;
    communicating to a server in a data center with a transmission system coupled to the image display device, the camera, the microphone, and the speaker, the transmission system being configured to transmit audio and video to the observation zone and to receive audio and video from the observation zone;
    analyzing the voice and video image of the customer captured in the observation zone, using video management software on a server in the data center to detect a presence of the customer in the observation zone while at least one of the preselected video content and the preselected audio content are observable by the customer within the observation zone; and
    calculating charges to an advertising company based on the presence of the customer being detected in the observation zone while the at least one of the preselected video content and the preselected audio content are observable by the customer within the observation zone,
    wherein the observation zone is defined with two walls and a ceiling extending between the walls, with a portion of the ceiling providing the backdrop reflected by the two-way mirror,
    wherein the observation zone is configured to accommodate the customer between the walls and under the ceiling, and
    wherein the communications system comprises the observation zone, the transmission system, the data center, the image display device, the two-way mirror, the speaker, the camera and the microphone.

2. The method of claim 1, further comprising:
    charging for professional services delivered to the customer in the observation zone by the transmission system being configured to enable a professional services provider remote from the observation zone to interact with the customer as a live image at approximately life-size in real time.

3. The method of claim 1 further comprising at least one of:
    delivering professional services to the customer in the observation zone;
    charging for professional services delivered to the customer in the observation zone; and
    marketing and selling products to the customer in the observation zone,
    wherein the communications system enables the customer to interact with a displayed computer image of a lifelike avatar generated in real time that is able to converse with the customer through artificial intelligence to respond to the voice and video image of the customer in a two-way dialogue.

4. The method of claim 1, further comprising using peripheral devices integrated into the communications system that perform functions that deliver services to the customer in the observation zone.

5. The method of claim 1, further comprising using peripheral payment devices integrated into the communications system for the customer to pay for services and products.

6. The method of claim 1, further comprising displaying a QR code on the image display device for the customer to capture the QR code to be connected to an advertising website; and
    charging the advertising company for at least one of:
        connecting the customer to the advertising website, and
        for sales resulting from subsequent use by the customer of the advertising website.

7. The method of claim 1, further comprising:
    transmitting calculated charges to an advertising company; and
    generating income by collecting payment from the advertising company; and
    using at least part of the income to offset a cost of leasing of the communications system.

8. The method of claim 7, further comprising providing the communications system to a company for use by the company at no added cost to the company, wherein the company providing a location to operate the communications system, and generates income through delivery of professional services through usage of the communications system.

9. The method of claim 1, wherein the video content displayed to the customer includes images of people,
wherein the image display device is positioned in the observation zone to display the images of people as life-sized or near-life-sized to the customer when the customer is in the observation zone, the video content including the images of people,
wherein the images of people are at least one of prerecorded or are transmitted real time from a location remote to the observation zone, and the images of people are included in the video content displayed by the image display device to the customer in the observation zone,
wherein the images of people that are prerecorded are included in the video content as one of the preselected video content and additional prerecorded video content displayed after the image display device displays the preselected video content to the customer, and
wherein the images of people that are transmitted real time are included in the video content as one of the preselected video content and additional video content displayed after the image display device displays the preselected video content to the customer.

10. A method for managing a visitor in an architectural space with a communications system, comprising:
displaying video of a receptionist on an image display device that is observable by the visitor in an observation zone within the architectural space through a two-way mirror positioned between the observation zone and the image display device, with the two-way mirror angled at approximately 45 degrees to reflect a backdrop positioned a further distance from the two-way mirror than the image display device so that the visitor in the observation zone will view the video as three dimensional imagery, through the two-way mirror that superimposes a depth relationship on the video relative to the backdrop;
capturing a video image of the visitor in the architectural space with a camera;
capturing a voice of the visitor in the architectural space with a microphone;
projecting audio into the the observation zone that is audible by the visitor with a speaker;
communicating to a server in a data center with a transmission system coupled to the image display device, the camera, the microphone, and the speaker and configured to transmit audio and video to the architectural space and to receive audio and video from the architectural space;
receiving video, audio and data over a network connection to the server in the data center that indicate a presence of the visitor in the architectural space; and
analyzing incoming transmission of video, audio and data in video management software at the data center to make an appropriate selection based on a programmed priority of responses and to initiate prerecorded video of a receptionist to run at the image display device or to route a transmission of a live receptionist from a contact center,
wherein the observation zone is defined with two walls and a ceiling extending between the walls, with a portion of the ceiling providing the backdrop reflected by the two-way mirror,
wherein the observation zone is configured to accommodate the visitor between the walls and under the ceiling, and
wherein the communications system comprises the observation zone, the transmission system, the data center, the image display device, the two-way mirror, the speaker, the camera and the microphone.

11. The method of claim 10, further comprising analyzing the incoming transmission of video to perform facial recognition for a purpose of identifying the visitor.

12. The method of claim 10, further comprising using a peripheral device that can be remotely controlled to unlock doors to provide access to other architectural spaces.

13. The method of claim 10, further comprising using a peripheral device to print visitor badges.

14. The method of claim 10, further comprising implementing functions of the video management software on the server to route the incoming transmission of video from one receptionist to another receptionist or a security guard, depending on a need for representation at the architectural space.

15. A method for providing professional services with a communications system comprising:
displaying video of a professional services provider on an image display device that is observable by a client in an observation zone within a meeting space through a two-way mirror positioned between the observation zone and the image display device, with the two-way mirror angled at approximately 45 degrees to reflect a backdrop positioned a further distance from the two-way mirror than the image display device so that the client in the observation zone will view the video as three dimensional imagery, through the two-way mirror that superimposes a depth relationship on the video relative to the backdrop;
capturing a video image of the client in the meeting space with a camera;
capturing a voice of the client in the meeting space with a microphone;
projecting audio into the meeting space that is audible by the client with an audio amplification and speaker system comprising a speaker;
communicating to a server in a data center with a transmission system coupled to the image display device, the camera, the microphone, and the speaker and configured to transmit audio and video to the the meeting space and to receive audio and video from the meeting space; and
running a video management software program to route video communication between the meeting space and an appropriate professional services provider,
wherein the observation zone is defined with two walls and a ceiling extending between the walls, with a portion of the ceiling providing the backdrop reflected by the two-way mirror,
wherein the observation zone is configured to accommodate the client between the walls and under the ceiling, and
wherein the communications system comprises the observation zone, the transmission system, the data center, the image display device, the two-way mirror, the speaker, the camera and the microphone.

16. The method of claim 15, further comprising using peripheral devices to conduct financial transactions including signature pad, credit card reader, cash dispenser, photo id reader, scanner, and combinations of same.

17. The method of claim 15, further comprising using peripheral devices to perform medical services, including heart rate cuff, dermascope, digital thermometer, and combinations of same.

18. The method of claim 15, further comprising using a secondary image display device positioned in the meeting space for viewing by the client with a network connection to a remote host system controlling the secondary image display device for a remote professional services provider to present visual information to be viewed by the client.

19. The method of claim 18, further comprising using the secondary image display device having a touch screen capability for the client to make selections that are transmitted to the server with the video management software program to initiate at least one of videos and responses to professional services processes.

20. The method of claim 18, further comprising displaying a QR code on the secondary image display device, with the QR code providing access on a mobile device carried by the client to further professional services to client that can be accessed through the mobile device.

21. The method of claim 18, further comprising displaying a QR code on the secondary image display device, with the QR code providing an application to use a mobile device to control a selection by client and display of content on the image display device.

22. A method of communicating comprising:
operating a communications system in an observation zone configured to accommodate a user within the observation zone;
wherein the observation zone is defined by two walls and a ceiling extending between the walls, the walls including a first wall and a second wall opposite the first wall;
wherein the communications system is configured to enable a user to communicate through video and audio with a person in a remote location, with the person in the remote location appearing as images that are life-sized or near-life-sized and three-dimensional to the user in the observation zone; and
wherein the communications system comprises:
an image display device positioned to be observable from the observation zone, the image display device configured to display the images of the person in the remote location as life-sized or near-life-sized to the user in the observation zone;
a two-way mirror having a first edge mounted to the first wall and a second edge opposite the first edge mounted to the second wall, the two-way mirror being positioned between the observation zone and the image display device and angled to reflect a portion of the ceiling to the user in the observation zone;
an audio amplification and speaker system comprised of a speaker to play audio from the remote location into the observation zone;
a camera to capture a video image of the user in the observation zone;
a microphone to capture a voice of the user in the observation zone; and
a transmission system;
wherein the speaker, the camera and the microphone are each mounted to or within one of the first wall, the second wall and the ceiling,
wherein the transmission system is coupled to the image display device, the speaker, the camera and the microphone,
wherein the transmission system is configured to transmit audio and video of the person in the remote location to the observation zone and to transmit audio and video of the observation zone to the person at the remote location, and
wherein the two-way mirror superimposes a depth relationship onto the images of the person in the remote location relative to the portion of the ceiling that is reflected by the two-way mirror, providing a three-dimensional appearance of the images of the person to the user in the observation zone.

23. A communication system enabling a user to communicate through video and audio with a person in a remote location, comprising:
an image display device configured to display images of the person in the remote location to the user while the user is inside an observation zone, wherein the observation zone is defined by two walls and a ceiling extending between a first wall and a second wall opposite the first wall, and the observation zone is configured to accommodate the user under the ceiling and between the first wall and the second wall;
a two-way mirror having a first edge mounted to the first wall and a second edge opposite the first edge mounted to the second wall, wherein the two-way mirror is positioned between the observation zone and the image display device and angled to reflect a portion of the ceiling to the user inside the observation zone;
an audio amplification and speaker system comprised of a speaker configured to play audio from the remote location into the observation zone;
a camera configured to capture video images from the observation zone;
a microphone configured to capture audio from the observation zone; and
a transmission system,
wherein the speaker, the camera and the microphone are each mounted to or within one of the first wall, the second wall and the ceiling,
wherein the transmission system is coupled to the image display device, the speaker, the camera and the microphone, and the transmissions system is configured to transmit audio and video of the person in the remote location to the observation zone and to transmit audio and video captured in the observation zone to the person at the remote location, and
wherein the two-way mirror is configured to superimpose a depth relationship onto a display by the image display device, relative to the portion of the ceiling that is reflected by the two-way mirror, providing a three-dimensional appearance of the person in the remote location to the user while the user is inside the observation zone.

* * * * *

UNITED STATES PATENT AND TRADEMARK OFFICE
CERTIFICATE OF CORRECTION

PATENT NO. : 9,800,829 B2
APPLICATION NO. : 15/090490
DATED : October 24, 2017
INVENTOR(S) : Peter McDuffie White Page 1 of 1

It is certified that error appears in the above-identified patent and that said Letters Patent is hereby corrected as shown below:

In the Claims

In Column 25, Line 25, Claim 21, delete "selection by client" and insert --selection by the client--.

Signed and Sealed this
Second Day of January, 2018

Joseph Matal
*Performing the Functions and Duties of the
Under Secretary of Commerce for Intellectual Property and
Director of the United States Patent and Trademark Office*